United States Patent [19]
Lebeck et al.

[11] Patent Number: 4,887,395
[45] Date of Patent: Dec. 19, 1989

[54] WAVY-TILT-DAM SEAL RING AND APPARATUS FOR SHAPING SEAL RINGS

[75] Inventors: Alan O. Lebeck, Albuquerque; Lionel A. Young, Edgewood, both of N. Mex.

[73] Assignee: University of New Mexico, Albuquerque, N. Mex.

[21] Appl. No.: 239,634

[22] Filed: Sep. 2, 1988

Related U.S. Application Data

[62] Division of Ser. No. 15,863, Feb. 17, 1987, Pat. No. 4,836,561.

[51] Int. Cl.$^4$ .................. B24B 19/00; B24B 19/26
[52] U.S. Cl. ...................................... 51/101 R; 51/127
[58] Field of Search ............ 51/50 PC, 101 R, 281 C, 51/281 P, 281 SF, 281 R, 127

[56] References Cited
U.S. PATENT DOCUMENTS
3,339,315 9/1967 Orain ................................ 51/101 R Primary Examiner—Frederick R. Schmidt
Assistant Examiner—Jack W. Lavinder
Attorney, Agent, or Firm—Deborah A. Peacock; Robert W. Weig

[57] ABSTRACT

A unique wavy-tilt-dam shaped mechanical face seal ring, a mechanical face seal which incorporates the wavy-tilt-dam shaped ring, and an apparatus for shaping seal rings. The face shape of the ring is contoured to include a number of waves, tilts and a dam, for the purposes of promoting hydrostatic and hydrodynamic lift, and minimizing leakage in the seal. The apparatus includes a grinding wheel, a drive motor, a spindle, a cam, a cam follower, and flexure mounts to allow slight rotations of the grinding wheel or the face seal ring being ground, and thereby the apparatus machines contours onto the face of the ring.

5 Claims, 7 Drawing Sheets

WAVY-TILT-DAM SEAL RING AND APPARATUS FOR SHAPING SEAL RINGS

This invention was made with government support under a contract awarded by the U.S. Department of the Navy, Office of Naval Research. The Government has certain rights in this invention. This is a divisional of co-pending application Ser. No. 015,863 filed on Feb. 17, 1987 now U.S. Pat. No. 4,836,561 issued on 6-6-89.

BACKGROUND OF THE INVENTION

This invention relates to face seal rings having waves, tilts and a dam. The invention also relates to a seal which utilizes wavy-tilt-dam shaped rings. The invention further relates to an apparatus for making face seal rings.

In conventional face seals where no deliberate means of controlling the shape of the fluid film is used, operating life can be shorter than desired, particularly in high speed, high pressure applications or where operating conditions change frequently or are of great magnitude. A longer life seal having greater reliability would be of considerable economic benefit in many applications.

Seals often fail ultimately by allowing excessive leakage. This type of failure is caused by the faces wearing out, thermal cracking of a face, or poorly distributed wear. The key to minimizing this type of problem is to minimize actual mechanical contact of the faces while, at the same time, maintaining a small gap between the faces. To do this requires that most of the load on the face be supported by fluid pressure (which causes much lower friction than mechanical contact and virtually no wear). Such fluid pressure load support is commonly called thick film lubrication.

It is very difficult in the prior art to control the sealing fluid to provide just enough pressure so as to support most of the load, yet not too much pressure so as to cause the faces to separate and leak excessively. One must control the shape of the seal gap very precisely so that hydrostatic and hydrodynamic pressures develop, and yet minimize the leakage gap. Several prior art patents, which are discussed below, disclose this objective.

U.S. Pat. No. 4,407,512, entitled HIGH PRESSURE ROTARY MECHANICAL SEAL, to Trytek, discloses the use of hydropads to enhance lubrication. Hydropads are semicircular shallow recesses cut into one of the faces and positioned so that they are open to pressure at the edge of the seal ring and terminate part way across. These pads ensure that more lubricant is present. However, the disadvantages of hydropads are: (1) They do not provide hydrostatic lift; and, (2) They do not provide hydrodynamic lift unless the recesses are very shallow, in which case machining is difficult and the shallow recesses tend to wear away.

U.S. Pat. No. 4,290,613, entitled POSITIVE CLEARANCE RADIAL FACE SEALS to Scott, discloses a deflectable face to control clearance. The deflectable face deforms to a shape which forms a converging film. Although the Scott invention is a creative concept, it suffers from the disadvantages of complexity, high cost of manufacture, inability to compensate for wear, lack of hydrodynamic load support, and high leakage associated with a radially convergent seal having no sealing dam.

Other patents disclose various patterns of seal ring grooves to enhance lubrication. U.S. Pat. No. 3,744,805, entitled SLIDE RINGS FOR AXIALLY ACTING SHAFT SEALING RINGS, to Heinrich, discloses many types of groove patterns extending partially across the face of a seal ring. U.S. Pat. No. 4,420,162, entitled MECHANICAL SEAL AND METHOD OF FORMING A SLIDING SURFACE THEREOF, to Yamai et al., discloses grooves which extend all across the face of the seal ring in various patterns. The supply of lubricant is improved with both of these seals, but the grooves themselves do not increase hydrodynamic lubrication.

U.S. Pat. No. 3,738,667, entitled SELF-ENERGIZING FACE SEALS, to Symons, discloses a design feature which causes natural waves to develop and enhance lubrication. U.S. Pat. No. 4,212,475, entitled SELF ALIGNING SPIRAL GROOVE FACE SEAL, to Sedy, discloses the use of spiral grooves to improve hydrodynamic lubrication. Both of the patterns on these seal rings are widely different from the seal ring shape of the present invention.

A moving wave mechanical face seal has been described in A.O. Lebeck, Design of an Optimum Moving Wave and Tilt Mechanical Face Seal for Liquid Applications, "9th *International Conference on Fluid Sealing*, Apr. 1-3, 1981; A.O. Lebeck and L.A. Young, "The Wavy Mechanical Face Seal, Theoretical and Experimental Results," Summary Report ME-111(81)ONR-414-1, *Bureau of Engineering Research*, January 1981; A.O. Lebeck et al., "Application of the Wavy Mechanical Face Seal to Submarine Seal Design," Report No. ME-117(82)ONR-414-1, *Bureau of Engineering Research*, July 1982; and L.A. Young and A.O. Lebeck, "The Design and Testing of Moving Wave Mechanical Face Seals Under Variable Operating Conditions in Water," Preprint No. 85-7C-1C-1, *American Society of Lubrication Engineers*, October 1985. The seal ring in this face seal is made of a flexible material which is deformed during operation into a wavy shape. To prevent uneven wear of the soft flexible material, the seal provides for slowly "moving" the wave on the face of the ring independently of the rotation of the ring. Although this moving wave seal invention achieves enhanced performance characteristics due to the wave shape, it has several disadvantages: (1) The ring cannot be utilized in standard seal systems and requires a great number of additional complex parts; and (2) The cost of manufacture is too high.

Accordingly, it is an object of the present invention to provide a unique wavy-tilt-dam seal ring which promotes hydrostatic and hydrodynamic lubrication and yet minimizes leakage of a seal.

It is another object of the present invention to provide a wavy-tilt-dam seal ring with an extremely long life, even under arduous operating conditions.

Yet another object of the present invention is to provide a seal having enhanced lubrication characteristics, a minimal number of parts, and which can be manufactured and operated at a low cost.

Another object of the present invention is to provide a seal with predictable and consistent operating parameters.

Still another object of the present invention is to provide a grinding apparatus which produces high precision contours on face seal rings at a low cost.

Other objects and further scope of applicability of the present invention will become apparent from the detailed description to follow, taken in conjunction with the accompanying drawing.

SUMMARY OF THE INVENTION

To overcome the problems of the prior art, a seal ring is provided which has a wavy-tilted surface and a sealing dam on its face The combination of the waviness and the tilt promotes hydrostatic and hydrodynamic load support for a seal. The sealing dam ensures low leakage of the seal. Improved lubrication provided by the seal promotes long life and low friction, with consistent operation and high reliability. The invention further provides for an apparatus which can grind or machine contours onto the face of a seal ring, including the specific wavy-tilt-dam contours.

The seal ring of the present invention comprises unique wavy-tilt-dam shape, which is machined or ground onto the face of a rigid seal ring. The wavy-tilt-dam shape comprises: (1) a dam which is a generally flat annular circumferential surface and which is narrower than the radial width of the ring; (2) circumferential waves which increase in amplitude radially away from the dam and which decrease in amplitude radially towards the dam; and (3) tilts or tilted regions which tilt downward and away from the dam. The dam can be positioned on the ring face at the inner or outer perimeters of the ring, or on the interior of the face between these perimeters. The waves preferably have an amplitude of between 1-10 micrometers, and most preferably an amplitude of approximately 2.5 micrometers, at the point of radial contact where the waves reach their maximum amplitude.

When the wavy-tilt-dam ring is used in a seal, the wavy-tilt portion of the ring promotes hydrodynamic and hydrostatic lift, and the dam, which provides a seal, minimizes leakage. Moreover, lubrication of the seal is enhanced, while friction of the seal is minimized. Operation of the seal is consistent and reliable and ring life is increased due to the wavy-tilt-dam shape.

Preferably, the wavy-tilt-dam shape is used for the mating ring of the seal. Preferably, the mating ring is made of a rigid or hard material having a high Young's modulus. Preferably, the primary or opposing ring is made of a softer material with a lower Young's modulus, so that it can readily conform to the harder mating ring.

The apparatus of the invention is useful for grinding or machining contours onto the face of a seal ring. The apparatus preferably comprises: (1) holding means, such as a clamp, for holding the ring to be ground; (2) a spindle which attaches to the ring holding means to allow the seal ring to be rotated during grinding; (3) driving means, such as a motor, for driving and rotating the spindle; (4) a cam which can rotate with the spindle; (5) a cam follower which contacts the cam during operation; (6) a cantilever spring which is attached to the cam follower; (7) at least one flexure mount which rotates when the cantilever spring moves; (8) a surface which is attached to the flexure mount; (9) a grinding wheel; and (10) grinding wheel driving means to drive and rotate the grinding wheel. In the preferred embodiment, the flexure mount is attached to the same surface as the ring holding means, to cause a slight movement of the ring holding means, during operation, and thereby obtain contours on the seal ring. In an alternative embodiment, the flexure mount is attached to the same surface as the grinding wheel driving means to cause a slight movement of the grinding wheel, during operation, and thereby obtain contours on the seal ring.

During operation of the apparatus, the ring and cam are rotated via the spindle, the cam causes the cam follower to move, which in turn causes the cantilever spring to move, which in turn causes the flexure mount to move, which in turn causes the surface which is either attached to the ring holding means (preferred embodiment) or the grinding wheel driving means (alternative embodiment) to move, thereby causing a slight movement between the grinding wheel and the ring which causes contours to form on the face of the ring. The relatively coarse contours of the cam produce very slight contours on the ring. The cam is shaped in accordance with the desired contours on the ring. To grind flat shapes, such as a dam, the cam is detached from the spindle or fixed so that it will not rotate with the spindle. Preferably, the grinding wheel has rounded edges so that rounded wave contours can be ground onto the seal ring.

Preferably the apparatus comprises three primary axes which are perpendicular to each other. The flexure mount preferably rotates about an x—x axis; the grinding wheel preferably rotates about a y—y axis; and the cam, spindle, and seal ring preferably rotate about a z—z axis. If more than one flexure mount is used, these flexure mounts should also rotate about the x—x axis of the primary flexure mount.

Using flexure mounts and a simple cam, the grinding apparatus of the invention is relatively inexpensive to manufacture and operate and provides a simple and economic means to grind contours onto the surface of a hard ring material. The apparatus is useful for grinding a wavy-tilt-dam shape, as well as other shapes, onto the face of a seal ring.

DESCRIPTION OF THE PREFERRED EMBODIMENT

This invention relates to a unique seal ring design, an improved seal, and an apparatus for making contours on the face of seal rings. The ring design has a wavy-tiltdam shape which improves the performance characteristics of the seal. The apparatus is useful for making this unique wavy-tilt-dam shape, as well as other seal ring shapes.

Figure 1:
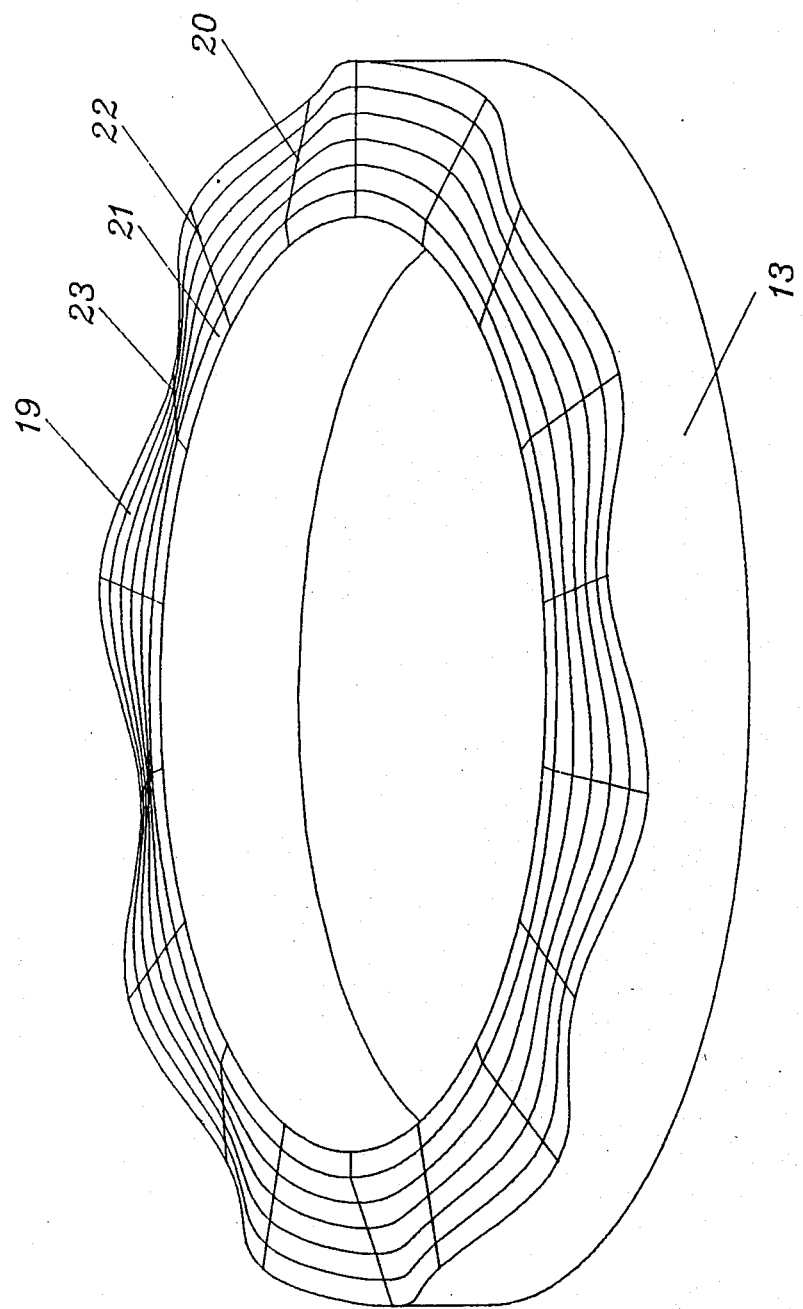
FIG. 1 of the drawing is an exaggerated isometric view of a seal ring of the present invention showing contours on the face of the ring and a dam at the inner circumference of the face of the ring.
Figure 2:
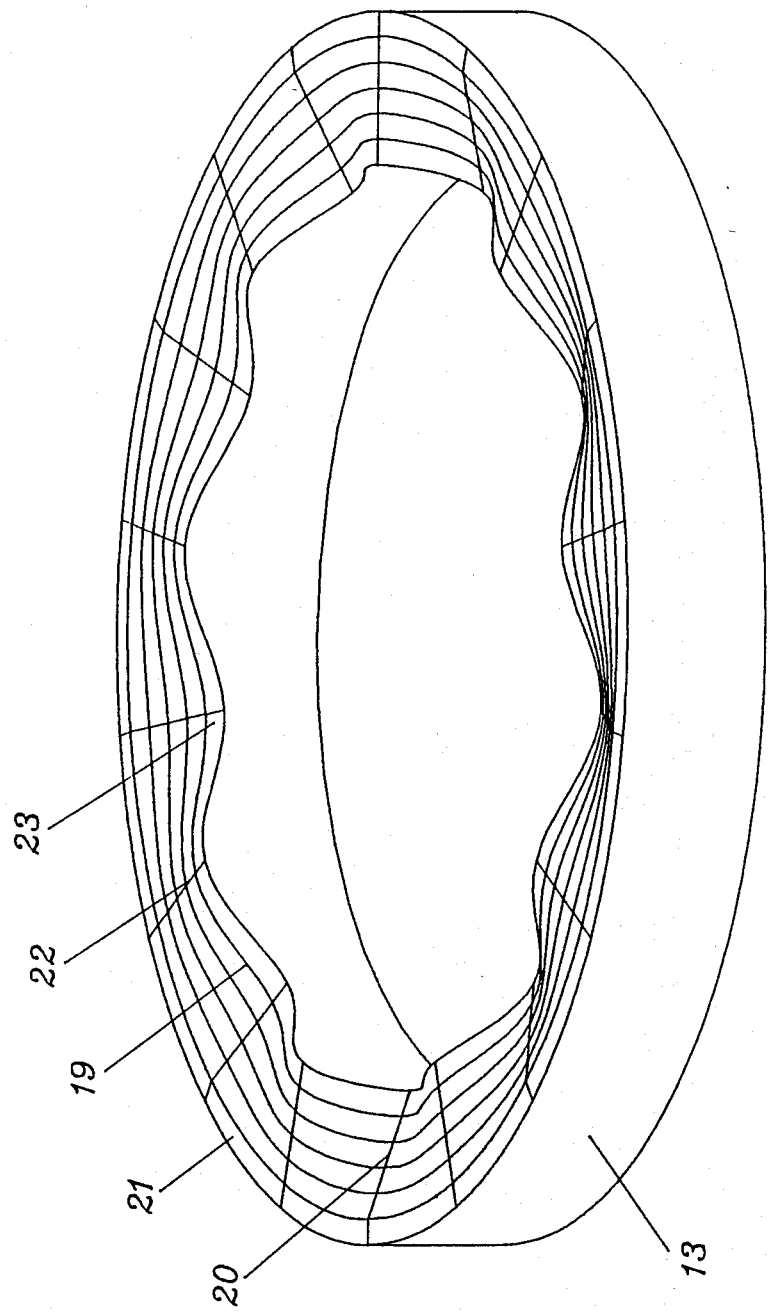
FIG. 2 of the drawing is an exaggerated isometric view of an alternative embodiment of the seal ring of the present invention, showing contours on the face of the ring and a dam at the outer circumference face of the ring.
Figure 3:
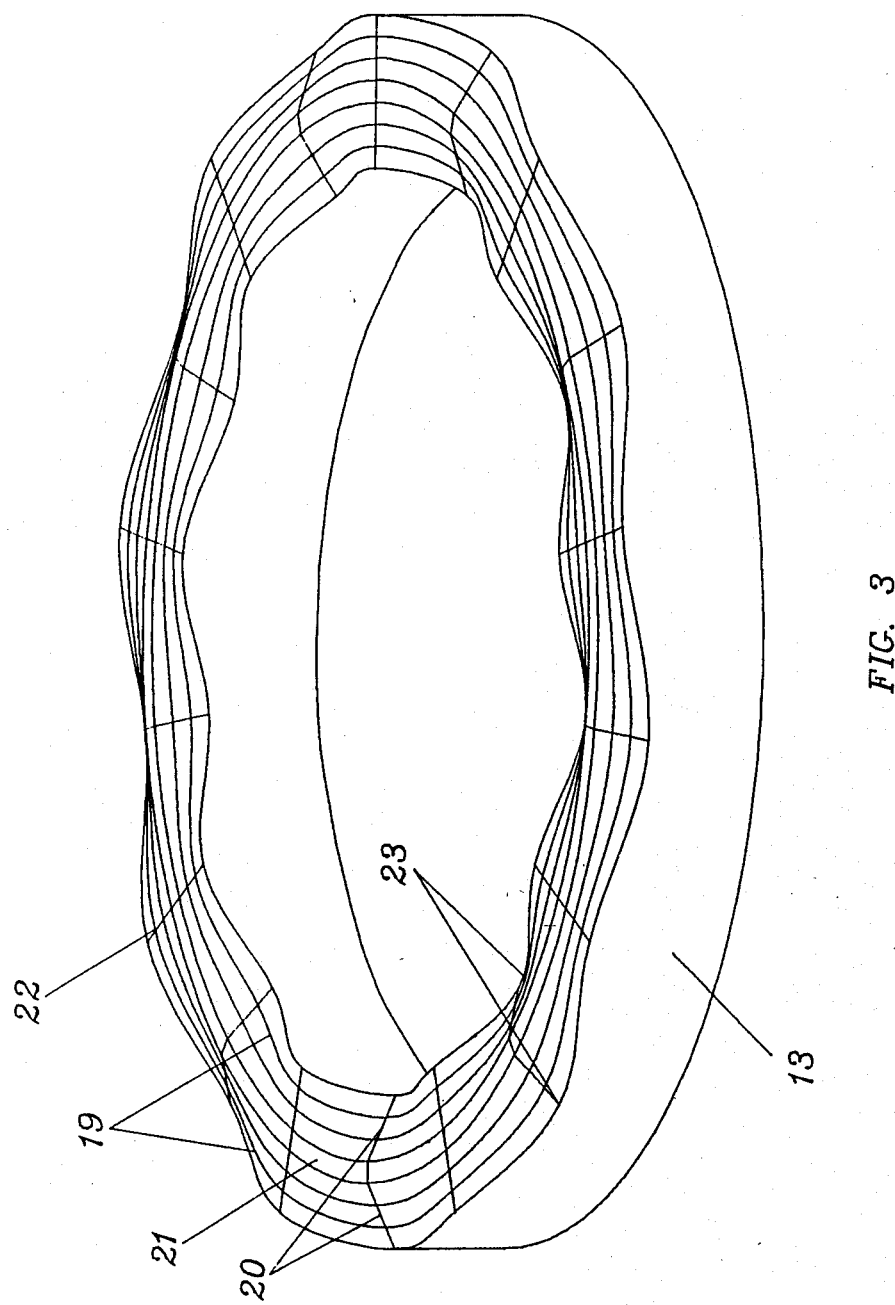
FIG. 3 of the drawing is an exaggerated isometric view of an alternative embodiment of the seal ring of the present invention, showing contour the face of the ring and a dam near the middle of the face ring.

FIGS. 1-3 illustrate the unique shape of the face of the ring of the present invention which is machined or ground onto the face of a ring made of a rigid or hard material having a high Young's modulus. For the purposes of discussing the invention, the unique face shape of the invention is described as being present on a mating ring; however, in some applications, it may be desirable to utilize this unique shape for a primary ring. In general, the wavy-tilt-dam shape should be machined or ground onto the ring (either the mating or the primary ring) which has the hardest or most rigid material.

FIGS. 1-3 are isometric views of the ring 13 showing this unique shape in exaggerated form. The face of the ring comprises a multiplicity of circumferential waves 19, a multiplicity of radial tilted regions or tilts 20, and a circumferential dam 21 which are machined or ground onto the face of the ring. The waves 19 and tilts 20 tend to enhance lubrication, and thus minimize friction; the dam 21 tends to minimize leakage. The dam 21 is generally a flat, high circumferential area or annular surface on the face of the ring. The dam 21 touches or is in close contact with the opposing or primary ring, when installed in the seal. The dam 21 is generally parallel to the base of the ring. Each wave 19 is formed in a circumferential or tangential direction on the face of the ring. The waves 19 diminish in amplitude as one moves radially towards the dam 21 and vanish entirely at the dam 21. The waves 19 increase in amplitude as one moves radially away from the dam 21. The waves 19 have high spots 22 which are generally as high as the dam 21 and low spots 23 which are also the low spots of the tilts 20. Preferably, the waves 19 are more of a curved or flowing shape as shown in FIGS. 1-3; however, other wave shapes, such as a blocky wave shape, could also be utilized in accordance with the invention. The tilts 20 are preferably formed in a radial direction, and tilt downward from the dam 21 and away from the primary or opposing ring, when installed in the seal. The high spots 22 and tilts 20 can also be placed at other angles as well as radial. The circumferential and radial lines shown in FIGS. 1-3 are merely for the purposes of showing the contours of this wavy-tilt-dam shape and the high and low spots on the face; these lines are not present as grooves or markings on the face of the seal. The shape of the ring of the present invention is referred to as a "wavy-tilt-dam" shape throughout the specification due to this unique combination of waves 19, tilts 20 and the dam 21 on the face of the ring.

FIG. 1 shows a wavy-tilt-dam shaped ring 13 with the dam 21 at or near the inner perimeter of the ring 13. This embodiment is useful for a seal having a high pressure at the outside of the seal such that the tapered or tilted regions 20 are filled with lubricating fluid from outside the ring 13. FIG. 2 shows a wavy-tilt-dam shaped ring 13 with the dam 21 at or near the outer perimeter of the ring 13. This embodiment is useful for a seal having a high pressure at the inside of the seal such that the tapered or tilted regions 20 are filled with lubricating fluid from the inside of the ring 13. FIG. 3 shows a wavy-tilt-dam seal with the dam 21 near the middle of the face of the ring 13. This design could be pressurized by lubricating fluid from the inside and/or outside of the ring 13. This middle-dam arrangement is useful for a seal which must, for some reason, operate eccentrically. Thus, in some regions the dam 21 will be more near the pressurized fluid side 11 of the seal, and at other regions the dam 21 will be more near the leakage side 66 of the seal (See FIG. 4). The advantageous hydrodynamic actions, discussed below, occur even if the wavy-tilt-dam shaped ring appears on the leakage side of the seal 66 in liquid operation. Although FIGS. 1-3 illustrate three positions for the dam 21 on the face of the ring, the dam 21 could be positioned anywhere on the face of the ring, depending upon the desired application. Thus, the wavy-tilt-dam shape can accommodate all liquid face seal applications, common to the art.

The wavy-tilt-dam ring shape of the present invention is uniquely capable of performing four functions: (1) promoting hydrodynamic lift; (2) promoting hydrostatic lift; (3) providing a seal (the dam); and (4) maintaining the ring geometry by continuously lapping flat the primary ring. These characteristics promote consistent fluid film lubrication which minimizes friction and leakage. Thus, a long seal and ring life with consistent reliable operation, is achieved by the present invention.

Figure 4:
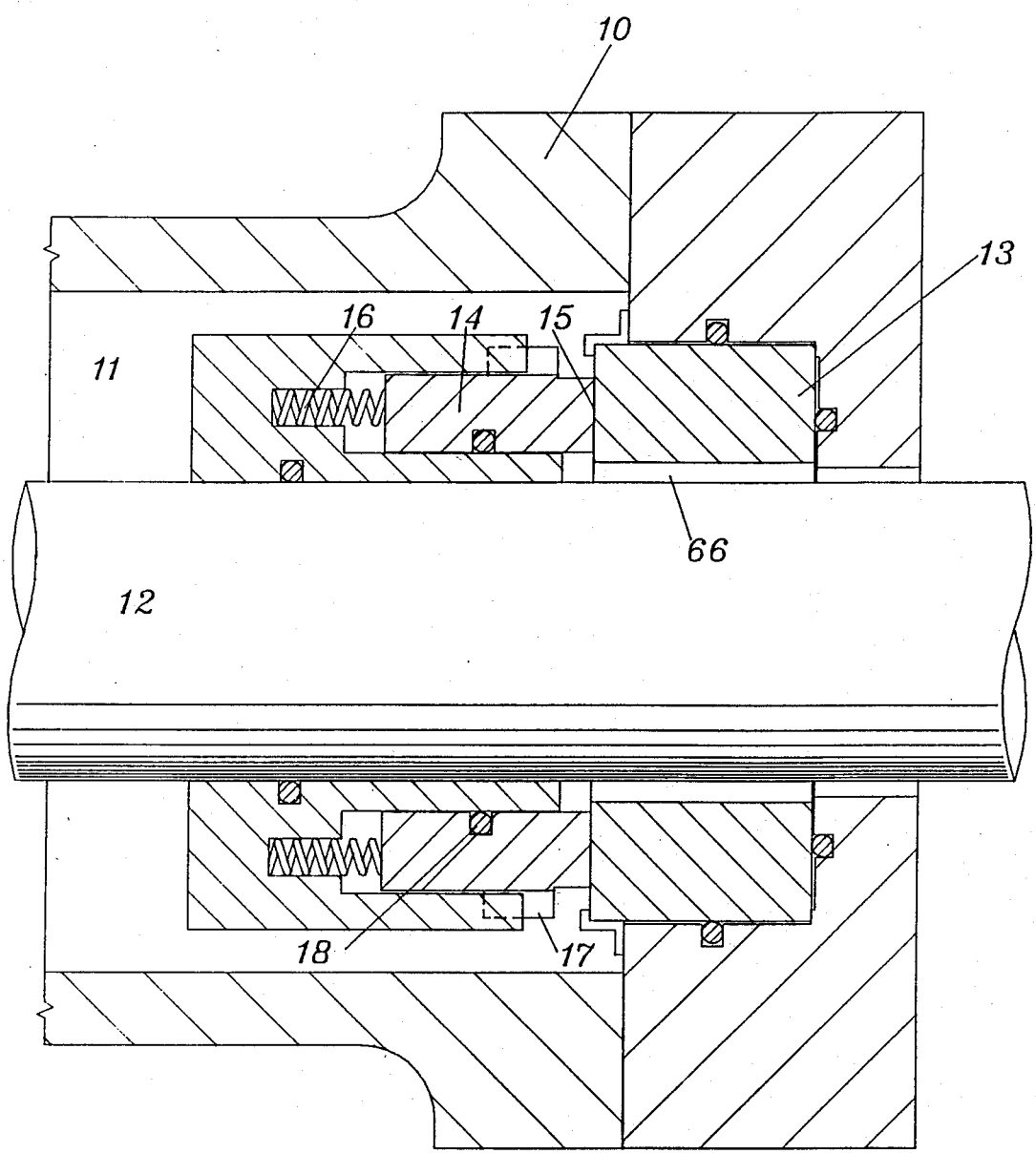
FIG. 4 of the drawing is an assembly view of a preferred mechanical face seal of the present invention, showing interface contact at on the seal ring of the present invention.

FIG. 4 illustrates a preferred mechanical face seal which incorporates special features for the purpose of improving performance of the seal using the wavy-tilt-dam face shaped ring of the present invention. The seal assembly shown in FIG. 4 represents a general type of seal application: The present invention can be used in a wide range of seal applications and is not limited to the specific seal assembly shown in FIG. 4.

Referring to FIG. 4, the preferred seal of the invention comprises a housing 10, a rotating shaft 12, a mating ring 13, a primary ring 14, sealed fluid 11, closing means such as a spring 16, driving means such as a drive lug 17, and a secondary seal 18, such as an O-ring. As mentioned previously, the wavy-tilt-dam shape would generally be used for the mating ring 13, although it could also be utilized for the primary ring 14.

The housing 10 contains the pressurized fluid 11 which is sealed into the housing 10 even though the rotating shaft 12 enters into the housing 10. The mating ring 13 and the primary ring 14 serve the primary function of sealing sliding interface 15 between the two rings 13 and 14 by maintaining either a close gap or contact between the faces of the two rings 13 and 14 so as to limit the amount of leakage flow. The springs 16 urge the two rings 13 and 14 into contact. The drive lugs 17 cause the primary ring 14 to rotate with the shaft 12. The O-ring 18 permits the seal faces to self align. Although FIG. 4 shows the primary ring 14 on the left and the mating ring 13 on the right, these rings can be easily inverted, depending upon the application.

Figure 5:
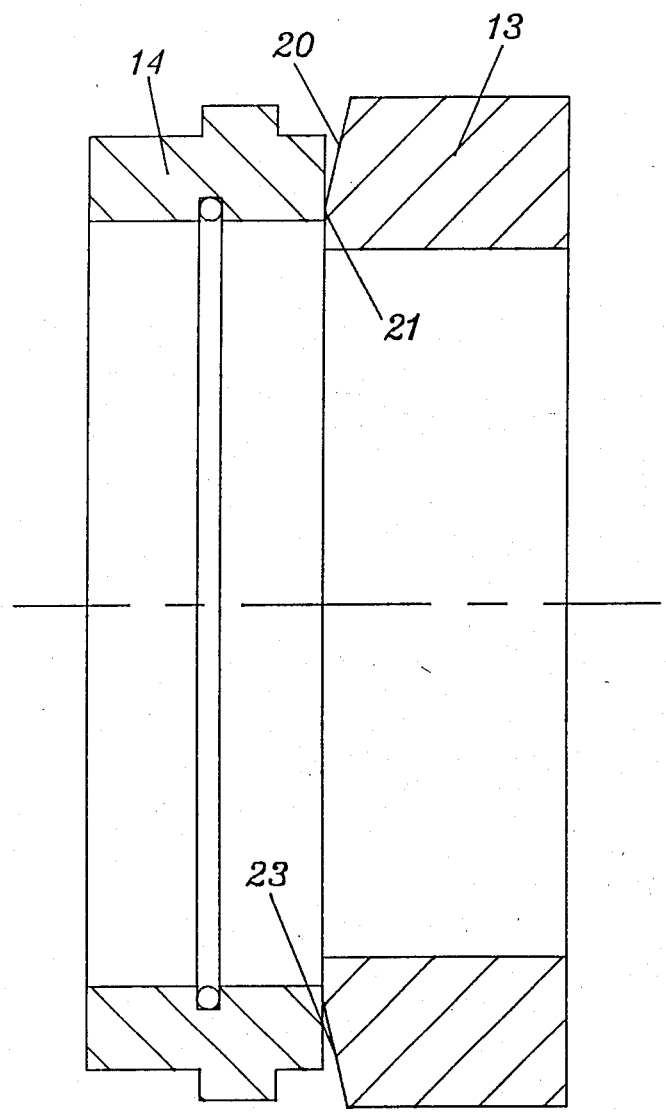
FIG. 5 of the drawing is an exaggerated section view of two seal rings showing interface contact at low points on the ring of the invention shown in FIG. 1.

FIG. 5 shows contact of the mating ring 13 of FIG. 1 with the primary ring 14 at low spots 23 on the mating ring 13. FIG. 4 shows contact of the mating ring 13 of FIG. 1 with the primary ring 14 at high spots 22 on the mating ring 13.

From FIGS. 1-5, it can be seen that the fluid film thickness will generally be wavy moving in the circumferential direction. This feature is important in that waviness promotes hydrodynamic lubrication under sliding conditions such as at the sliding interface 15. Between the high spots 22, as one moves radially, the fluid film thickness converges at the tilted regions 20. It is well known in the art that a radially convergent taper provides fluid pressure load support in seals by hydrostatic means; this type of hydrostatic lift has a positive stiffness so as to provide more and more lift as the gap becomes smaller. Contact at the sliding interface 15 occurs around the entire circumference of the ring 13 at the dam 21. This contact serves the purpose of minimizing leakage. The three combined features of the ring 13 (the wave 19, the tilt 20, and the dam 21) cause good lubrication of the ring faces while restricting leakage. During operation of the seal, the unique ring shape of the present invention continuously laps the primary ring 14 flat so that the primary ring 14 is substantially parallel and in contact with the high spots 22 and the dam 21 of the wavy-tilt-dam surface; thus, the wear of the primary ring 14 does not diminish performance of the seal.

The following is a discussion of several preferred features of the wavy-tilt-dam shape of the present invention. Also discussed below is the preferred operation of the seal of the invention.

The wavy-tilt-dam ring of the invention preferably has a zero moment design. The natural tilt caused by pressure is therefore small and does not act to either reduce or add to the tilt machined onto the surface of the ring. This is very important because if pressure changes are permitted to cause a tilt of the face, then the face presentation will be different at different operating pressures. In applications where operating pressure changes, this variation in face presentation would accelerate wear of the faces; however, with the use of the face design of the present invention, such wear is minimized.

The primary ring used in the seal of the present invention also preferably has a zero moment design. This characteristic is designed into the primary ring for the same reasons as mentioned above. A zero moment design is particularly useful for primary rings because they are generally made of a lower Young's modulus material.

The primary ring used in the seal of the present invention preferably has a very low moment of inertia about its radial axis and is preferably made of a low modulus material, such as carbon, so that it can readily conform to normal distortions present on the face of the mating ring. This ensures that the primary and mating rings are in contact at the sealing dam all around the seal to minimize leakage. Preferably, the mating ring of the invention is mounted and sealed off in such a way that large mechanical forces are not present which will cause the ring to develop large unplanned waves which cannot be closed by the conformability of the primary ring.

The balance ratio, which is defined as the ratio of the closing area (the area upon which the fluid is applying pressure to close the seal faces) to the ring face area is preferably 1.0 so that the seal faces will continue to touch and minimize leakage under all operating conditions. However, the seal of the invention can be used at other balance ratios, depending on the application. At a lower balance ratio there is some risk that the seal faces might develop a greater lifting force than a closing force and will leak excessively. An analysis of the particular conditions for a specific application is useful to determine a suitable compromise between friction, wear, and leakage as they are all affected by the balance ratio.

The wavy-tilt-dam shaped ring is preferably made of a rigid or hard material or a material which has a high Young's modulus, such as tungsten carbide, silicon carbide, cast iron, or stainless steel. The opposing ring is preferably made of a softer material or a material having a lower Young's modulus, such as carbon. The wavy-tilt-dam shaped ring is thus preferably very rigid and experiences very little wear; and, therefore, the wavy-tilt-dam profile degrades very little with usage. As mentioned previously, it is preferable to utilize a low modulus material for the opposing ring to provide conformability.

FIGS. 1-3 show nine waves on the face of the ring; however any number of waves may be used in accordance with the invention. The nine waves shown in FIGS. 1-3 are for illustrative purposes only and would be suitable for a particular application. The specific number of waves to be machined onto the face of the ring may vary to a wide degree depending on the application. For example, three waves might be useful in one seal application, whereas hundreds of waves might be useful in a different seal application. There is always some natural waviness present on the face of a ring in the lower harmonic numbers of two, three and four. This natural waviness comes from manufacturing errors and distortions in operation and installation, and is to be carefully distinguished from the planned number of waves to be machined onto the face of the ring, in accordance with the invention. The number of planned waves is preferably determined based on the stiffness or conformability of the primary or opposing seal ring. There should be a sufficient number of waves so that the planned wave is not significantly flattened out by the normal loading of the seal. Preferably, the stiffness of the primary ring is selected first so that it will readily conform to expected distortions and shapes of both itself and the mating ring. The number of waves is preferably high enough and the shape of the waves is preferably curved so that the primary ring does not deflect too much, relative to the imposed wave.

The magnitude of the amplitude of the waviness at the radius of contact of the ring of the present invention corresponding to maximum waviness preferably ranges between 1 to 10 micrometers and most preferably is approximately 2.5 micrometers. A larger amplitude causes higher leakage but lower friction. A lower amplitude provides a low leakage but higher friction or wear. The design of the ring of the invention tolerates a wide range of waviness amplitudes, and is not limited to the preferred range mentioned above.

The selection of the number of waves, the amplitude of the wave, and the sealing dam width are details which depend on the actual seal application. All possible values of these parameters are considered to fall within the scope of this invention. An example of an analysis and design study which is useful to determine these parameters is described in detail in Lebeck, A.O., "Hydrodynamic Lubrication in Wavy Contacting Face Seals—A Two Dimensional Model," *Journal of Lubrication Technology*, v. 103, n. 4, October, 1981, pp. 578-586; this article discloses methods for determining wave parameters for other types of waves. The leakage and friction of the seal can also be predicted using methods similar to those in the article mentioned above. It was found that the seal of the present invention leaks a small amount, on the order of 0.1 cubic centimeter per minute at a pressure of 3.5 MPa and a diameter of 100 mm in water, and depending on speed.

The wavy-tilt-dam shape of the present invention is preferably machined or ground onto the face of the seal ring by the grinding apparatus of the invention. Wave shapes in the prior art, in general, can be readily lapped into the face of a seal ring. However, this lapping method cannot, in general, be utilized to obtain the wavy-tilt-dam shape of the present invention, because of the change of the wave amplitude across the seal ring face and because of the high number of waves often required. One prior art method which can be utilized to produce the wavy-tilt-dam shape of the present invention is a numerical control grinder; however, this is a very expensive process. The apparatus of the invention, shown in FIGS. 6 and 7, grinds or machines the wavy-tilt-dam shape onto the seal ring face with high accuracy and at a low cost. This apparatus may also be used to grind other contours onto face seal rings.

Figure 6:
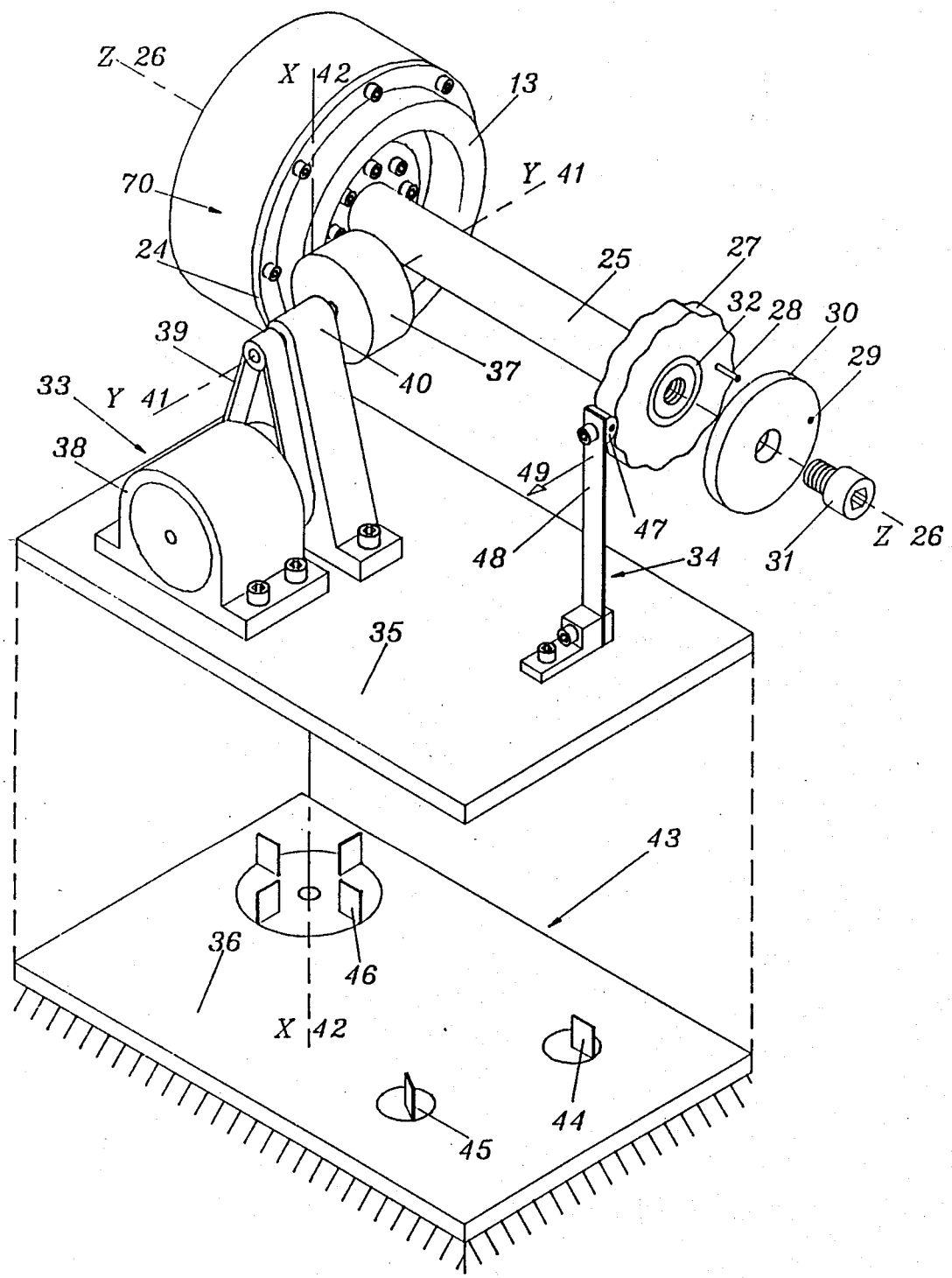
FIG. 6 of the drawing is an expanded isometric drawing of a grinding apparatus of the present invention used to grind contours onto the face of a seal ring.

FIG. 6 illustrates one embodiment of the grinding apparatus of the invention. This embodiment comprises four main assemblies: (1) a cam and spindle assembly 70; (2) a grinding assembly 33; (3) a cam follower assembly 34; and (4) a flexure mount assembly 43.

The cam and spindle assembly 70 preferably comprises a clamp 24 which holds the ring 13 to be ground, a slowly rotating precision spindle 25, and a cam 27. The clamp 24 is attached to the spindle 25 in an engine lathe, or a similar device, common to the art, which rotates about axis z—z 26. The cam 27 is also attached to the spindle 25 as shown in FIG. 6 and can rotate with the spindle 25 for grinding the contours. One means of forcing the cam 27 to rotate with the spindle 25 is by engaging a pin 28 on the cam 27 with a hole 29 on a disc 30 which can be clamped to the spindle 25 by a bolt 31. When it is necessary or desirable to prevent the cam 27 from rotating with the spindle 25, the bolt 31 is removed so that the cam 27 turns freely on a bushing 32, as shown in FIG. 6.

The cam 27 is Shaped to correspond to the contours to be ground onto the ring 13. Use of the apparatus of the invention translates large or "rough" contours from the cam 27 to very small contours on the ring 13.

The grinding assembly 33 of the apparatus of the invention preferably comprises a grinding wheel 37, a motor 38, and driving means, such as a belt 39. The grinding wheel 37 is driven by the motor 38, in a conventional arrangement, by the belt 39. The grinding wheel 37 preferably turns in bearings 40 about axis y—y 41.

The cam follower assembly 34 preferably comprises a cantilever spring 48 and a cam follower 47. The cam follower 47 is attached to the cantilever spring 48 and contacts the cam 27 during operation.

The flexure mount assembly 43 comprises a plate 36 and flexure beams or mounts which are seated on and attached to the plate 36. The flexure mount assembly 43 preferably comprises a primary flexure mount 46, having several flexure beams and which is centered on axis x—x 42, and two additional flexure mounts 44 and 45. Although FIG. 6 illustrates three flexure mounts (44, 45 and 46), a greater or fewer number of mounts may be provided, depending upon the support and flexure required. Likewise, although FIG. 6 illustrates four flexure beams on the primary flexure mount 46, a greater or fewer number of beams may be provided. The flexure mount assembly 43 preferably permits motion only about the x—x axis 42. Each of the flexure beams or mounts (44, 45 and 46) on this assembly 43 is rigidly mounted at its ends so that, for example, the flexure beam 46 can bend in the y—y direction 41 but cannot significantly deflect in the z—z direction 26 or extend in the x—x direction 42. In FIG. 6, axis y—y 41 is perpendicular to axis z—z 26 and to axis x—x 42. The purpose of the four flexure beams of flexure mount 46 as shown in FIG. 6 is to allow for motion only about the x—x axis 42. The additional flexure beams 44 and 45 are aligned so that their longitudinal axes (which are parallel to the plate 36) intersect the x—x axis 42 so as to allow motion only about the x—x axis 42. All of the flexure mounts 44, 45, and 46 provide additional support for the upper plate 35.

The grinding assembly 33 and cam follower assembly 34 are both attached to the upper plate 35. Each of the flexure beams (44, 45 and 46) is mounted to the lower plate 36 and to the bottom of the upper plate 35, when assembled, thus attaching the two plates 35 and 36. FIG. 6 illustrates the upper plate 35 and lower plate 36 in an expanded view to better show the flexure mounts 44, 45 and 46. The upper plate 35 moves as a unit with the grinding wheel 37 as it makes contact with the ring 13 to be ground. The upper plate 35 moves relative to the lower plate 36 rotationally about axis x—x 42, due to the flexure mounts 44, 45 and 46. This combination of flexure mounts 44, 45 and 46 shown in FIG. 6 produces a very rigid mounting of the upper plate 35, except for rotation about the x—x axis 42. The lower plate 36 is attached to the carriage of a lathe (not shown) which is movable in direction z—z 26. The upper plate 35 is positioned so that the x—x axis 42 passes through the edge of the dam 21 (where the tilt 20 begins) on the ring 13 at a location under the grinding wheel 37. This permits the dam portion 21 of the ring 13 to be formed.

The motion of the cam follower 47, as caused by the cam 27, causes a force 49 to be produced in the y—y direction 41 (as shown by the arrow). This force 49 is proportional to the displacement of the cam follower 47. This force 49 produces a moment about axis x—x 42 which is also proportional to the cam follower displacement. The upper plate 35 has a predictable rotational stiffness about axis x—x 42 based on the flexure mounts 44, 45 and 46. Thus, the amount of rotation of the plate 35 about axis x—x 42 caused by the force and moment is thus also predictable.

During operation of the grinding apparatus shown in FIG. 6, the ring 13 and the cam 27 rotate with the spindle 25 in order to obtain the wave 19 and tilt 20 shapes shown in FIGS. 1-3. As the cam 27 rotates, a small rotation of the upper plate 35 is created about axis x—x 42 due to the movement of the cam follower 47 and cantilever spring 48. This rotation, in turn, causes the grinding wheel 37 to rotate about axis x—x 42, thus grinding the surface of the mating ring 13 with tilted waves which are in exact relationship to the displacement caused by the cam 27. The relatively coarse motion of the cam 27 produces a very slight motion of the grinding wheel 37 which is proportional to the motion of the cam 27. Thus, the manufacture and operation of a large displacement cam 27 and the flexure mount assembly 43 is inexpensive compared to a device which directly provides the actual small motions needed. The dam 21 is formed by stopping the cam 27 and grinding a flat annular surface.

Figure 7:
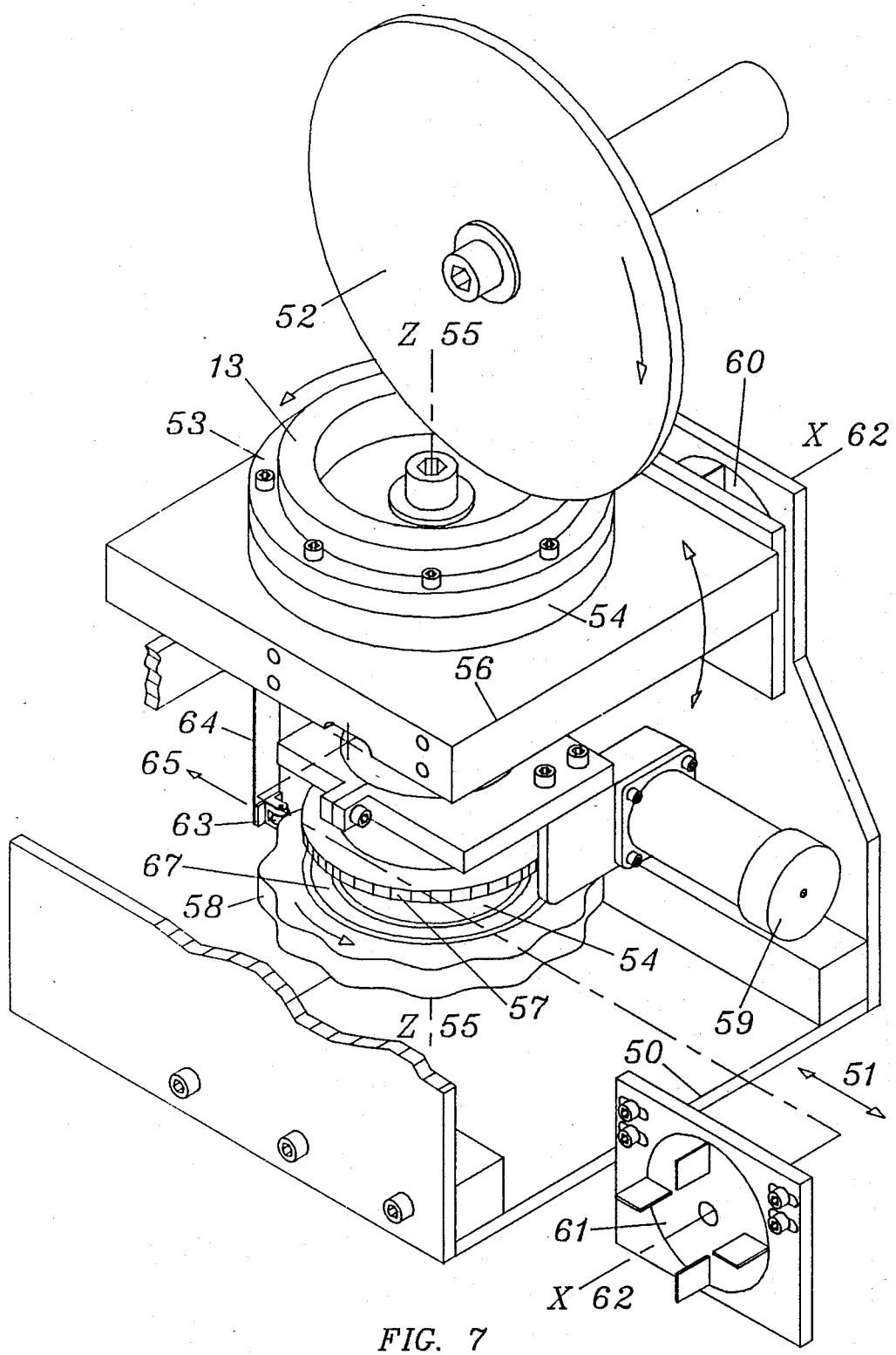
FIG. 7 of the drawing is an expanded isometric drawing of an alternative embodiment of a grinding apparatus of the present invention used to grind contours onto the face of a seal ring.

FIG. 7 illustrates an alternative and preferred embodiment of the grinding apparatus of the invention. The apparatus comprises a base 50, an upper plate 56, a grinding wheel 52, a clamp 53 for holding the ring 13 to be ground, a precision spindle 54, a cam 58, a cam follower 63, flexure mounts 60 and 61, and a drive motor 59. The clamp 53 which is attached to the spindle 54 holds the ring 13. The spindle 54 rotates about the z—z axis 55. The spindle 54 preferably rotates in precision bearings (not shown) which are attached to the upper plate 56. The spindle 54 extends through this upper plate 56. A gear 57 is attached to the spindle 54 and the cam 58 is attached to the bottom of the upper plate 56 with a bearing 67. The motor 59 drives the gear 57, causing the precision spindle 54, the cam 58, and the ring 13 all to rotate together. This rotation rate is preferably slow, requiring at least one minute to make a full revolution. This rotation allows all portions of the ring 13 to pass under the grinding wheel 52 as the grinding wheel 52 rotates and the table of the grinder reciprocates. The apparatus is designed so that the bottom of the base 50 is mounted on the horizontal table of a surface grinder (not shown) such that the normal reciprocating motion is in the direction shown by the arrows 51, and the limits of travel are set so as to grind across only one portion of the ring 13. For best results, the grinding wheel 52 should be dressed with a slight rounding or curvature at the edges of the wheel (not shown) so that a rounded wave pattern can be cut.

The upper plate 56 is mounted to the base 50 by flexure mounts. FIG. 7 shows two flexure mounts 60 and 61, although any number of flexure mounts could be utilized in accordance with the invention. FIG. 7 shows one flexure mount 61 removed from the assembly for illustrative purposes. The flexure mounts 60 and 61 function in a similar manner as described above in the discussion of the embodiment of FIG. 6. Their function is to allow rotation of the upper plate 56 only about axis x—x 62.

The cam follower 63 is attached to a cantilever spring 64 such that as the cam 58 rotates, the cam follower 63 causes a deflection of the cantilever spring 64 in the direction shown by the arrow 65. This, in turn, produces a moment about axis x—x 62 which, in turn, produces a small rotation of the upper plate 56 about axis x—x 62. This slight rotation creates a tilting of the upper plate 56 and the ring 13 in relation to the base 50 such that waves are ground into the surface of the ring 13 as the ring 13 rotates. The apparatus is designed that a plane which is perpendicular to the surface grinder table and intersecting axis x—x 62 intersects the ring 13 under the grinding wheel 52 at a location corresponding to the edge of the dam 21 on the ring 13. The dam 21 is ground by allowing the cam 58 to not rotate, such as on a bushing (not shown), while the ring 13 rotates on the precision spindle 54 and grinding is carried out Both embodiments of the grinding apparatus of the present invention may be utilized to manufacture wavy-tilt-dam shaped seal rings. Both embodiments may also be utilized to manufacture other ring shapes or contours.

EXAMPLE

Various tests were performed by a seal having a wavy-tilt-dam face seal ring shape, at various speeds, pressures, tilts, positioning of the dam, and over varying periods of time. The test results are shown in Tables 1–6.

TABLE 1

FIXED WAVE TEST RESULTS

| Test # | Conditions | Duration (Hours) | Initial Wave (Micro inch) | Final Wave (Micro inch) | Leakage (CC/Min) | Carbon Wear (Micro inch) |
|---|---|---|---|---|---|---|
| 130 | 500 PSI, 1800 RPM | 160 | 146 | 152 | 3.00 | 263 |
| 135 | 500 PSI, 1800 RPM | 100 | 75 | 69 | .017 | 800 48 Hrs/50 |
| 136 | 500 PSI, 1800 RPM | 148 | 59 | 59 | .067 | 148 Hrs/0 |
| 137 | 500 PSI, 1800 RPM | 91 | 81 | 78 | .389 | 63 |
| 138 | Variable Speed, Pressure and Tilt | 1953 | 78 | 61 | .19 | 363 |
| 140 | Variable Speed, Pressure and Tilt | 1974 | 59 | 68 | .15 | 281 |

TABLE 2

WEEKLY LEAKAGE AVERAGES FOR 2000 HOUR TESTS (cc/min)

| | Week | |
|---|---|---|
| Test # | 2 | 10 |
| 138 | .180 | .192 |
| 140 | .164 | .128 |

TABLE 2

2000 HOURS    ECCENTRIC SEAL WITH CENTRAL DAM

ONE WEEK AVERAGE TORQUE VALUES
TEST #142 (N-M)

| % Speed/ % Pressure | Week | | | | | | | | | | | Average[1] (N-M) |
|---|---|---|---|---|---|---|---|---|---|---|---|---|
| | 1 | 2 | 3 | 4 | 5 | 6 | 7 | 8 | 9 | 10 | 11 | |
| 14/7 | .65 | .96 | .66 | .82 | .13 | .51 | .30 | .84 | .16 | .14 | .27 | .48 |
| 14/50 | 2.94 | 3.55 | 2.56 | 1.71 | 1.35 | 2.26 | * | 1.65 | 2.48 | 3.99 | 3.45 | 2.56 |
| 14/100 | 10.43 | 9.21 | 6.20 | 4.86 | 5.06 | 4.83 | 4.45 | 5.83 | 8.26 | 10.21 | 10.23 | 6.91 |
| 33/100 | 2.37 | 3.05 | 1.83 | 1.94 | 1.36 | 1.72 | 1.59 | 1.89 | 1.98 | 4.72 | 3.42 | 2.35 |
| 100/50 | 1.86 | 1.26 | 1.47 | .90 | .98 | 1.40 | 1.53 | 2.14 | 1.04 | .93 | 1.23 | 1.29 |
| 100/100 | 2.20 | 1.94 | 1.96 | 1.66 | 1.58 | 1.87 | 2.08 | 1.64 | 1.65 | 1.56 | 1.79 | 1.77 |
| −33/100 | −1.03 | −.87 | −.45 | −1.05 | −1.15 | −.71 | −.56 | −.83 | −1.09 | −1.17 | −1.20 | −.91 |
| −100/100 | −1.60 | −1.29 | −1.49 | −.99 | −1.70 | −1.51 | −1.33 | −1.04 | −1.90 | −1.59 | −1.73 | −1.46 |

*Data not available (test shutdown)
[1] Excludes week #1

TABLE 4
ONE WEEK AVERAGE LEAKAGE VALUES
TEST #142
(cc/min)

| Week | | | | | | | | | | | Average[1] |
|---|---|---|---|---|---|---|---|---|---|---|---|
| 1 | 2 | 3 | 4 | 5 | 6 | 7 | 8 | 9 | 10 | 11 | cc/min |
| .661 | .329 | .191 | .165 | .117 | .123 | .133 | .193 | .137 | .192 | .187 | .177 |

[1] Excludes week #1

TABLE 5
KtSiC WAVINESS TRACE RESULTS
TEST #142

| Radial Location (in) | 20th Harmonic Amplitude | |
|---|---|---|
| | Initial ($\mu$ in) | Final ($\mu$ in) |
| 1.73 | 229.5 | 229.6 |
| 1.75 | 207.5 | 207.9 |
| 1.81 | 146.8 | 144.9 |
| 1.87 | 82.0 | 76.3 |
| 1.93 | 27.0 | 19.9 |
| 1.99 | .4 | 3.9 |
| 2.05 | 17.6 | .9 |
| 2.11 | 62.7 | 59.8 |
| 2.17 | 116.2 | 112.6 |
| 2.23 | 182.9 | 179.1 |

Note: Radial contact occurred from 1.84 to 2.24 in. (Outside radius of KtSiC ring = 2.2495 in.)

TABLE 6
CARBON WEAR RESULTS
TEST #142

| Position | Groove Depth (Micro inches) | | | | Wear (Micro inches) | |
|---|---|---|---|---|---|---|
| | Initial | | Final | | | |
| | Outside | Inside | Outside | Inside | Outside | Inside |
| 1 | 3850 | 3950 | 3550 | 3850 | 300 | 100 |
| 2 | 4050 | 4050 | 3775 | 4050 | 275 | 0 |
| 3 | 4300 | 4200 | 3850 | 4050 | 450 | 150 |
| 4 | 4350 | 4350 | 4025 | 4175 | 325 | 175 |
| 5 | 4525 | 4400 | 4150 | 4150 | 375 | 250 |
| 6 | 4400 | 4400 | 4250 | 4325 | 150 | 75 |
| 7 | 4150 | 4175 | 3875 | 4100 | 275 | 75 |
| 8 | 4050 | 4050 | 3650 | 3900 | 400 | |

Average Wear: 319 $\mu$in 122 $\mu$in

Although the invention has been described with reference to these preferred embodiments, other embodiments can achieve the same results. Variations and modifications of the present invention will be obvious to those skilled in the art and it is intended to cover in the appended claims all such modifications and equivalents.

We claim:

1. An apparatus for grinding or machining contours onto the face of a seal ring comprising:
   spindle means for rotationally positioning a seal ring having a surface with a face in a plane to be ground or machined;
   means comprising a grinding wheel turnable, within a rotational plane, about an axis of rotation;
   means for flexibly mounting said grinding wheel means, said mounting means providing an axis of rotation therefor substantially perpendicular to said axis of rotation of said grinding wheel and in the plane of the face of the surface to be ground, said axis of rotation for said grinding means being disposed to intersect said axis of rotation of said face plane at a preselectable position thereon and at a selectable distance from the rotational plane of said grinding wheel;
   cam means for providing a machining contour; and
   means for flexibly following said cam means operatively connected to said means for flexibly mounting said grinding wheel means, whereby the face of a seal ring can be machined to provide contours comprising radially tapered waves thereon.

2. An apparatus in accordance with claim 1 wherein the face of the seal ring to be ground or machined is disposed generally perpendicular to said spindle means.

3. An apparatus in accordance with claim 1 wherein said contours on said cam means are much larger than the corresponding contours which are ground or machined into the seal ring.

4. An apparatus in accordance with claim 1 wherein said contours on said cam means are shaped to correspond to the desired contours on the seal ring.

5. An apparatus in accordance with claim 1 wherein said grinding wheel means comprises a grinding wheel having a rounded circumferential edge to obtain rounded contours on the seal ring.

* * * * *